United States Patent
Hamanaka et al.

(10) Patent No.: US 6,523,985 B2
(45) Date of Patent: Feb. 25, 2003

(54) ILLUMINATING DEVICE

(75) Inventors: Kenjiro Hamanaka, Osaka (JP); Hiroyuki Nemoto, Osaka (JP)

(73) Assignee: Nippon Sheet Glass Co. Ltd., Osaka (JP)

(*) Notice: Subject to any disclaimer, the term of this patent is extended or adjusted under 35 U.S.C. 154(b) by 0 days.

(21) Appl. No.: 09/757,821

(22) Filed: Jan. 9, 2001

(65) Prior Publication Data
US 2001/0024372 A1 Sep. 27, 2001

(30) Foreign Application Priority Data
Jan. 14, 2000 (JP) ........................... 2000-006448

(51) Int. Cl.[7] ............................... F21V 7/04
(52) U.S. Cl. .................. 362/554; 362/333; 362/339; 385/115; 600/177
(58) Field of Search ............... 362/554, 333, 362/551, 558, 335–337; 385/115, 116, 117; 600/177, 182

(56) References Cited
U.S. PATENT DOCUMENTS
5,815,624 A * 9/1998 Rosenberg .................. 385/115
6,307,243 B1 * 10/2001 Rhodes ...................... 257/232

FOREIGN PATENT DOCUMENTS
JP   09146014 A   6/1997

* cited by examiner

Primary Examiner—Sandra O'Shea
Assistant Examiner—Ali Alavi
(74) Attorney, Agent, or Firm—Merchant & Gould P.C.

(57) ABSTRACT

According to the present invention, there is provided an illuminating device for illuminating a surface to be illuminated with light passed through a fiber bundle from a light source, wherein the shape of the exit end of the fiber bundle is linear (or narrowly rectangular), to correspond to the shape of the shape of a surface to be illuminated. A microlens array, a lenticular lens surface of which comprises a dense array of concave cylindrical microlenses, being of a shape that corresponds to the shape of the exit end of the fiber bundle, is provided at an end of the fiber bundle. Illumination thereby is effectively free of irregularities in the level of illumination across the surface to be illuminated.

4 Claims, 6 Drawing Sheets

FIG. 1
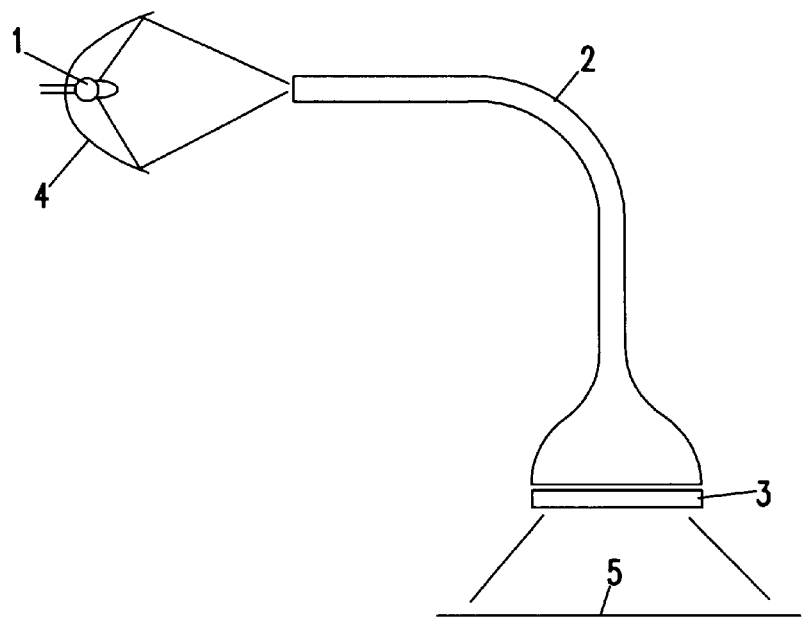
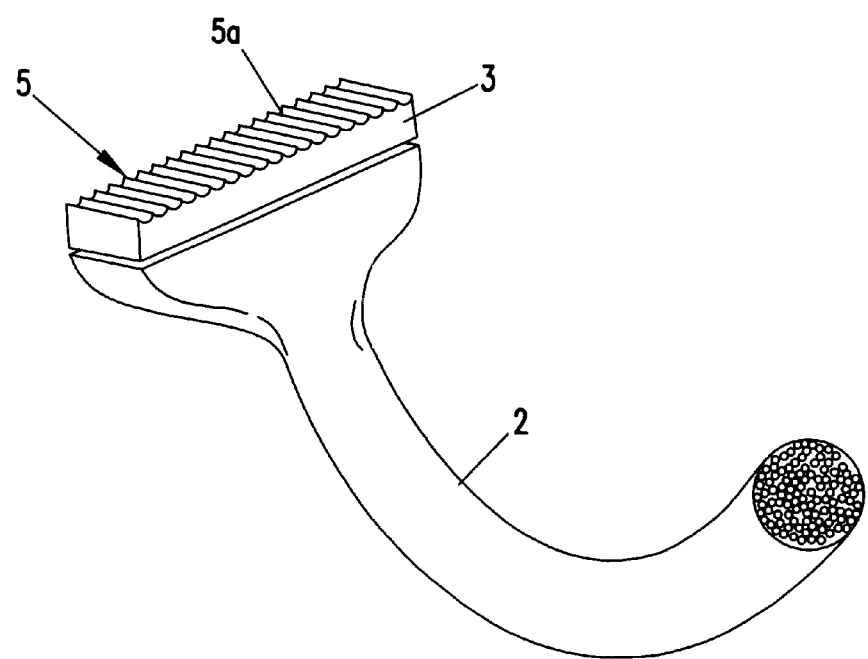
FIG. 2

FIG. 3A
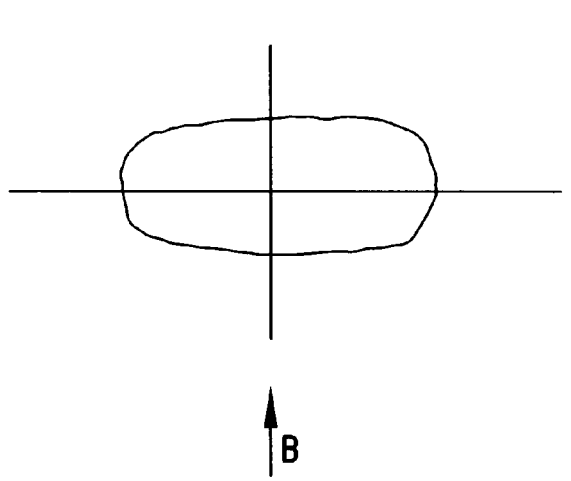
FIG. 3C
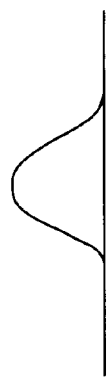
FIG. 3B
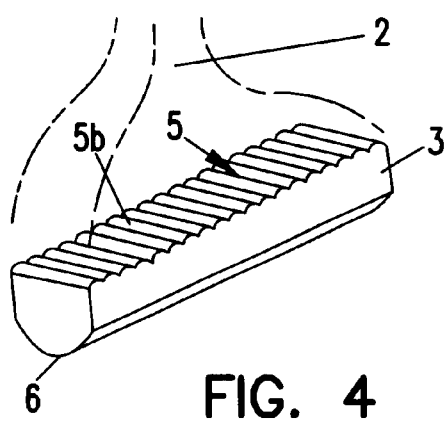
FIG. 4

FIG. 5A
FIG. 5C
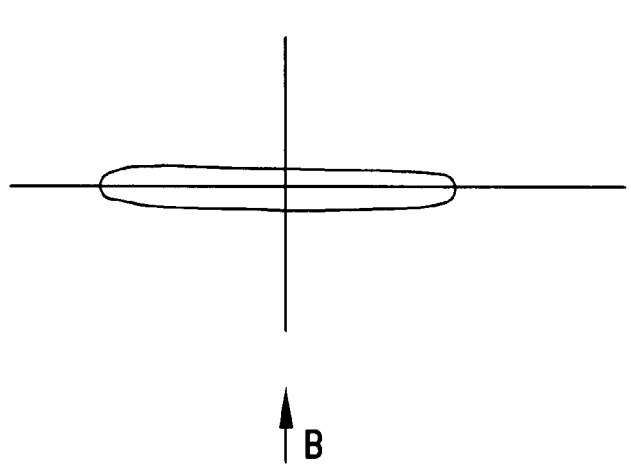
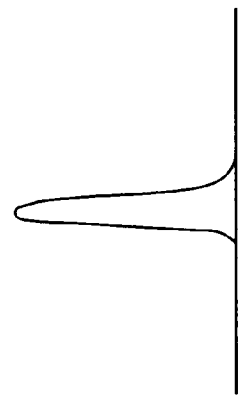
FIG. 5B

FIG. 8A
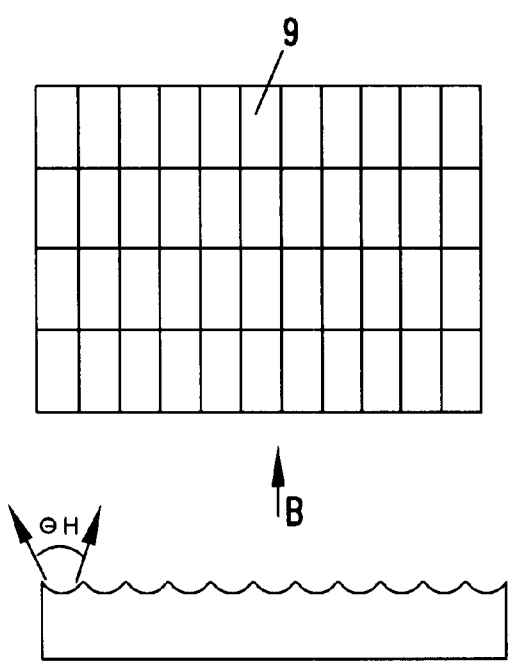
FIG. 8C
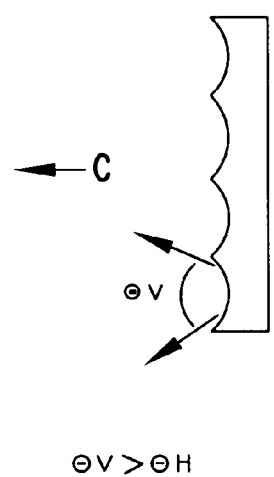
FIG. 8B
$\Theta V > \Theta H$
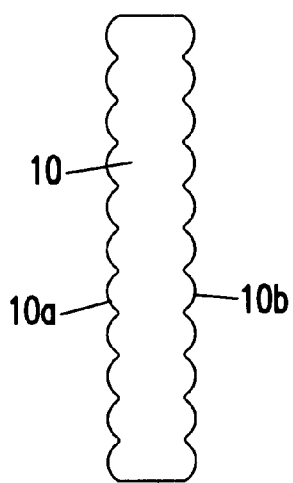
FIG. 9

FIG. 10
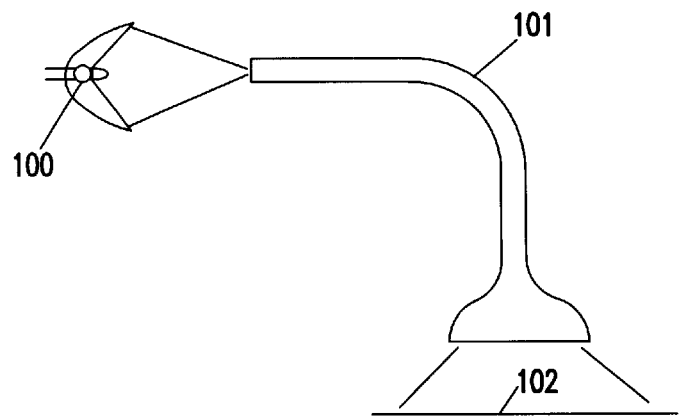
FIG. 11A
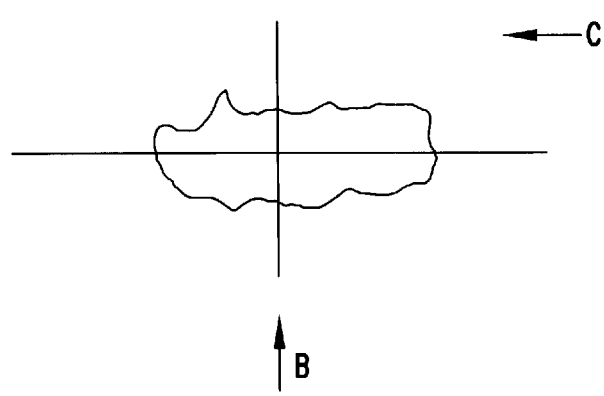
FIG. 11C
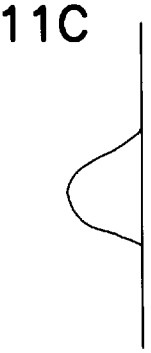
FIG. 11B

ILLUMINATING DEVICE

BACKGROUND OF THE INVENTION

1. Field of the Invention

The present invention relates to an illuminating device in which a fiber bundle, i.e. a bundle of optical fibers is used.

2. Description of the Related Art

A method for recording an image with a CCD camera and processing the image is well known in a measurement of the shape and size of a component, or an inspection of the presence of scratches and the appearance of a component, such as in an assembly line. In such a case, it is important to uniformly illuminate a subject without irregularities in illuminance level for an accurate measurement and inspection. Therefore, an illuminating device using an optical fiber bundle is conventionally used.

As shown in FIG. 10, the conventional illuminating device has a structure by which a surface to be illuminated 102 is illuminated with illuminating light from a light source 100 through a fiber bundle 101. In this device, it is possible to effectively utilize illuminating light by varying the shape of the emitting end portion of the fiber bundle 101 corresponding to the shape of the surface to be illuminated 102.

FIG. 11(a) is a facing view of the region illuminated by the conventional illuminating device shown in FIG. 10. FIG. 11(b) shows the illuminating light intensity distribution in a case of observing FIG. 11(a) from the direction designated by a and FIG. 11(c) shows the illuminating light intensity distribution in a case of observing FIG. 11(a) from the direction designated by C. These drawings show the occurrence of illuminance level irregularities. If such an illuminating device is incorporated in a liquid crystal display device or the like, it causes deterioration in the performance or quality of such products.

Japanese laid-open patent publication No. 9-146014 discloses prior art in which a diffusing plate, comprising a lens such as a lenticular lens, is positioned at the exit end of a fiber bundle. In this art, a magnifying lens is positioned at the exit end of the fiber bundle and a diffusing plate is positioned at the focal point of the magnifying lens, thereby the possibility of observation from various directions is achieved. However, in a device according to this art, illuminating light for illuminating a surface is not uniformly diffused.

SUMMARY OF THE INVENTION

According to the present invention, there is provided an illuminating device for illuminating a surface to be illuminated with light passed through a fiber bundle from a light source, wherein a microlens array is provided at the end surface of said fiber bundle to uniformly diffuse illuminating light for illuminating a surface to be illuminated or to make illuminating light converge on one portion.

As a light source, a halogen lamp, a metal halide lamp, a xenon lamp, and so on may be used. The wavelength thereof may be in the ultraviolet region and is not limited to light of the visible wavelength region. Further, it is preferable to obtain a light source by combining a lamp with an oval reflecting mirror. In a fiber bundle, either of a glass fiber or a resin fiber may be used. A microlens may be obtained by conducting an etching upon silica glass, an injection molding, a molding using photopolymers, or the like. Furthermore, a microlens may be positioned at the incident (light source) end of the fiber bundle or at the exit end of the fiber bundle.

In a specific structure of an illuminating device according to the present invention, the shape of the exit end of the fiber bundle is made linear or narrowly rectangular. A microlens array the shape of which corresponds to the shape of the exit end of the fiber bundle is positioned at the exit end of the fiber bundle. The microlens array comprises a lenticular lens. The longitudinal direction of each of microlenses which form the lenticular lens coincides with the shorter side of the exit end of the fiber bundle.

In another specific structure of an illuminating device according to the present invention, the shape of the exit end of the fiber bundle is made linear or narrowly rectangular. A microlens array the shape of which corresponds to the shape of the exit end of the fiber bundle is positioned at the exit end of the fiber bundle. A lenticular lens is formed on one surface of the microlens array, and a cylindrical lens is formed on the other surface of the microlens array. The longitudinal direction of each of microlenses which form the lenticular lens coincides with the shorter side of the exit end of the fiber bundle, and the longitudinal direction of the cylindrical lens coincides with the longer side of the exit end of the fiber bundle.

In another specific structure of an illuminating device according to the present invention, the shape of the exit end of the fiber bundle is made annular. An annular microlens array the shape of which corresponds to the shape of the exit end of the fiber bundle is positioned at the exit end of the fiber bundle. A surface to be illuminated is illuminated with light from this annular microlens array through an axicon lens.

In another specific structure of an illuminating device according to the present invention, the shape of the exit end of the fiber bundle is made rectangular. A rectangular microlens array the shape of which corresponds to the shape of the exit end of the fiber bundle is positioned at the exit end of the fiber bundle and is formed by densely arranging rectangular microlenses. In addition, each of the rectangular microlenses has different radiuses of curvature with respect to length and width, so that the angle of convergence and divergence of illuminating light is different with respect to length and width.

BRIEF DESCRIPTION OF THE DRAWINGS

FIG. 1 is an explanatory view of an illuminating device according to the present invention;

FIG. 2 is a perspective view of a fiber bundle which is a component of an illuminating device according to the present invention, FIG. 3(a) is a facing view of an illuminated region, FIG. 3(b) is a diagram showing the illuminating light intensity distribution in a case of measuring the illuminated region along the direction designated by B and FIG. 3(c) is a diagram showing the illuminating light intensity distribution in a case of measuring the illuminated region along the direction designated by C;

FIG. 4 is a cut-away perspective view of a microlens array according to another embodiment of the present invention;

FIG. 5(a) is a facing view of the region illuminated by the microlens array shown in FIG. 4, FIG. 5(b) is a diagram showing the illuminating light intensity distribution in a case of measuring the illuminated region along the direction designated by B and FIG. 5(c) is a diagram showing the illuminating light intensity distribution in a case of measuring the illuminated region along the direction designated by C;

FIG. 8(a) is a facing view of a microlens array according to another embodiment of the present invention, FIG. 8(b) is a view of FIG. 8(a) from the direction designated by B and FIG. 8(c) is a view of FIG. 8(a) from the direction designated by C;

FIG. 9 is a cross-sectional view of a microlens array according to another embodiment of the present invention;

FIG. 10 is an explanatory view of a conventional illuminating device; and

FIG. 11(a) is a facing view of a region illuminated by the conventional illuminating device, FIG. 11(b) is a diagram showing the illuminating light intensity distribution in a case of measuring the illuminated region along the direction designated by B and FIG. 11(c) is a diagram showing the illuminating light intensity distribution in a case of measuring the illuminated region along the direction designated by C.

DETAILED DESCRIPTION OF THE PREFERRED EMBODIMENTS

Figure 6:
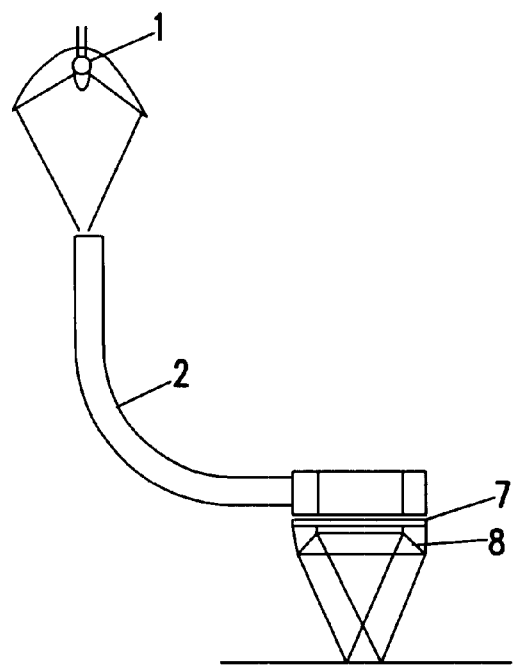
FIG. 6 is an explanatory view of an illuminating device according to another embodiment of the present invention.
Figure 7:
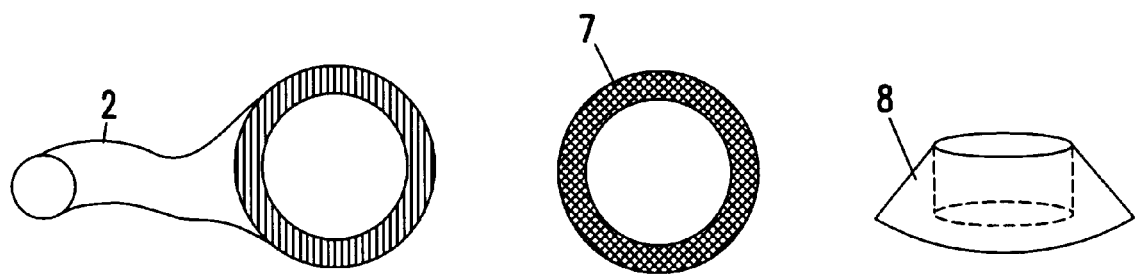
FIG. 7 includes 3 perspective views of elements of the illuminating device shown in FIG. 6.

Hereinafter, embodiments according to the present invention will be fully explained with reference to the attached drawings.

As shown in FIG. 1, an illuminating device according to the present invention comprises a light source 1, a fiber bundle 2, and a microlens array 3, wherein the light source 1 comprises an oval reflecting mirror 4 and the shape of the exit end of the fiber bundle 2 is made to correspond to the shape of a surface to be illuminated 5 (for example, a liquid crystal display panel). In this embodiment, the shape is of a linear or slender elongated rectangular shape.

The shape of the microlens array 3 is nearly of a cuboid shape corresponding to the shape of the exit end of the fiber bundle 2 As shown in FIG. 2, the microlens away 3 is a lenticular lens 5 comprised of a number of concave cylindrical microlenses 5a formed on a substrate. The cylindrical lens 5a may be convex.

The longitudinal direction of each of the cylindrical microlenses 5a which form the lenticular lens 5 coincides with the shorter side of the exit end of the fiber bundle 2. As a result of this, illuminating light incident on the lenticular lens 5 from the exit end of the fiber bundle 2 is diffused along the longitudinal direction of the exit end of the fiber bundle 2 through each of the cylindrical microlenses 5a, thereby an illuminating light intensity distribution which is uniform with respect to the longitudinal direction of the illuminated region can be obtained as shown in FIG. 3(b).

In another embodiment of the microlens array according to the present invention shown in FIG. 4, a lenticular lens 5 is formed on one surface of the microlens array 3, and a single cylindrical lens 6 is formed on the other surface of the microlens array 3.

The longitudinal direction of each of convex cylindrical microlenses 5b which form the lenticular lens 5 coincides with the shorter side of the exit end of the fiber bundle 2 and the longitudinal direction of the single cylindrical lens 6 coincides with the longer side of the exit end of the fiber bundle 2. As a result of this, with respect to the illuminated region as shown in FIG. 5(a), uniform illuminating light intensity distribution can be achieved by the lenticular lens 5 with respect to the longer side of the illuminated region as shown in FIG. 5(b), and illuminating light is focused at the center portion with respect to the short side of the illuminated region by the cylindrical lens 6, as shown in FIG. 5(c).

In another embodiment of the microlens array according to the present invention as shown in FIG. 6, for application in an optical device such as a microscope or the like, the shape of the exit end of the fiber bundle 2 is made annular. A corresponding annular microlens array 7 is positioned at or adjacent to the exit end of the fiber bundle 2, and illuminating light is made incident on an axicon lens 8 through the microlens array 7. The arrangement of microlenses which form the microlens array 7 is determined according to the intended purpose of the device. For example, they may be densely arranged in a square, hexagon or delta pattern.

In another embodiment of the microlens array according to the present invention as shown in FIG. 8, the shape of a microlens array 9 is made rectangular. As microlenses 9a which form the microlens array 9, concave rectangular lenses are densely arranged. Each of the microlenses 9a has different radiuses of curvature with respect to length and width, so that it is possible to optionally adjust the shape of the illuminated region. For example, an illuminated region of a square shape can be changed to a rectangular shape, and vice versa.

In another embodiment of the microlens array according to the present invention as shown in FIG. 9, convex microlenses 10a and 10b formed in a similar arrangement, in which one among the convex lens 10a and 10b has a focal point which coincides with the focal point of the other convex lens, form a microlens array 10, With this structure, it is possible to more effectively prevent illumination level irregularities compared with a case of forming lenses only on one surface.

According to the present invention, as described above, since the microlens array is positioned at the exit end or the incident end of the fiber bundle in the illuminating device for illuminating a surface to be illuminated with light from a light source through the fiber bundle, it is possible to make uniform the intensity distribution of illuminating light or to converge illuminating light upon a specific portion, thereby the illuminating device according to the present invention can exhibit superior characteristics as an illuminating device applied to various kinds of optical devices.

What is claimed is:

1. A device for illuminating a surface to be illuminated with light passed through a fiber bundle from a light source, comprising: an array of microlenses provided at an exit end of said fiber bundle to uniformly diffuse light for illuminating the surface to be illuminated or to make light converge on one portion of the surface to be illuminated, said exit end of said fiber bundle having a rectangular shape with a shorter side and a longer side; said microlens array comprising a lenticular lens having a shape corresponding to the shape of said exit end of said fiber bundle and being positioned at said exit end of said fiber bundle; each of said microlenses having a longitudinal direction coinciding with the shorter side of said exit end of said fiber bundle.

2. A dice for illuminating a surface to be illuminated with light passed through a fiber bundle from a light source, comprising:

an array of microlenses provided at an exit end of said fiber bundle to uniformly diffuse light for illuminating the surface to be illuminated or to make light converge on one portion of the surface to be illuminated, said exit end of said fiber bundle having a rectangular shape with a shorter side and a longer side;

said microlens array comprising a lenticular lens formed on one surface thereof and a cylindrical lens formed on an opposite surface thereof, said lenticular lens having a shape corresponding to the shape of said exit end of said fiber bundle and being positioned at said exit end of said fiber bundle; each of said microlenses having a longitudinal direction coinciding with the shorter side of said exit end of said fiber bundle and said cylindrical lens having a longitudinal direction coinciding with the longer side of said exit end of said fiber bundle.

3. A device for illuminating a surface to be illuminated with light passed through a fiber bundle from a light source, comprising: an axicon lens and an array of microlenses provided at an exit end of said fiber bundle to uniformly diffuse illuminating light for illuminating tie surface to be illuminated or to make illuminating light converge on one portion of the surface to be illuminated, said exit end of said fiber bundle having an annular shape, said microlens array having a shape corresponding to the shape of said exit end of said fiber bundle and being positioned at said exit end of said fiber bundle, said surface to be illuminated being illuminated with light from said annular microlens array through said axicon lens.

4. A device for illuminating a surface to be illuminated with light passed through a fiber bundle from a light source, comprising an array of rectangular microlenses provided at an exit end of said fiber bundle to uniformly diffuse light for illuminating the surface to be illuminated or to make light converge on one portion of the surface to be illuminated, said exit end of said fiber bundle having a rectangular shape;

said rectangular microlens array having a shape corresponding to the shape of said exit end of said fiber bundle and being positioned at said exit end of said fiber bundle, said microlens array being formed by densely arranging said rectangular microlenses, each of said rectangular microlenses having different radiuses of curvature with respect to length and width, so that the angle of convergence and divergence of illuminating light is different with respect to length and width.

* * * * *